May 11, 1943.　　A. H. SNYDER　　2,318,809
POSITIVE ELECTRODE FOR STORAGE BATTERIES
Filed April 14, 1937
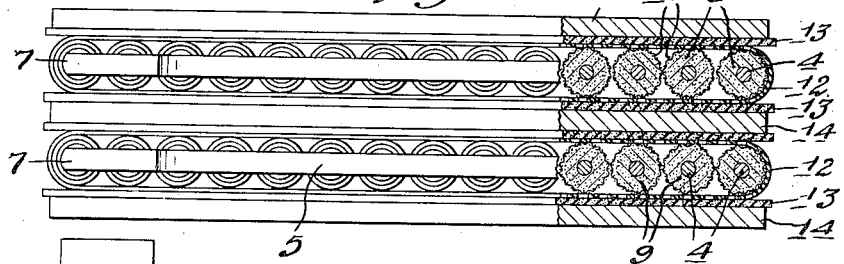
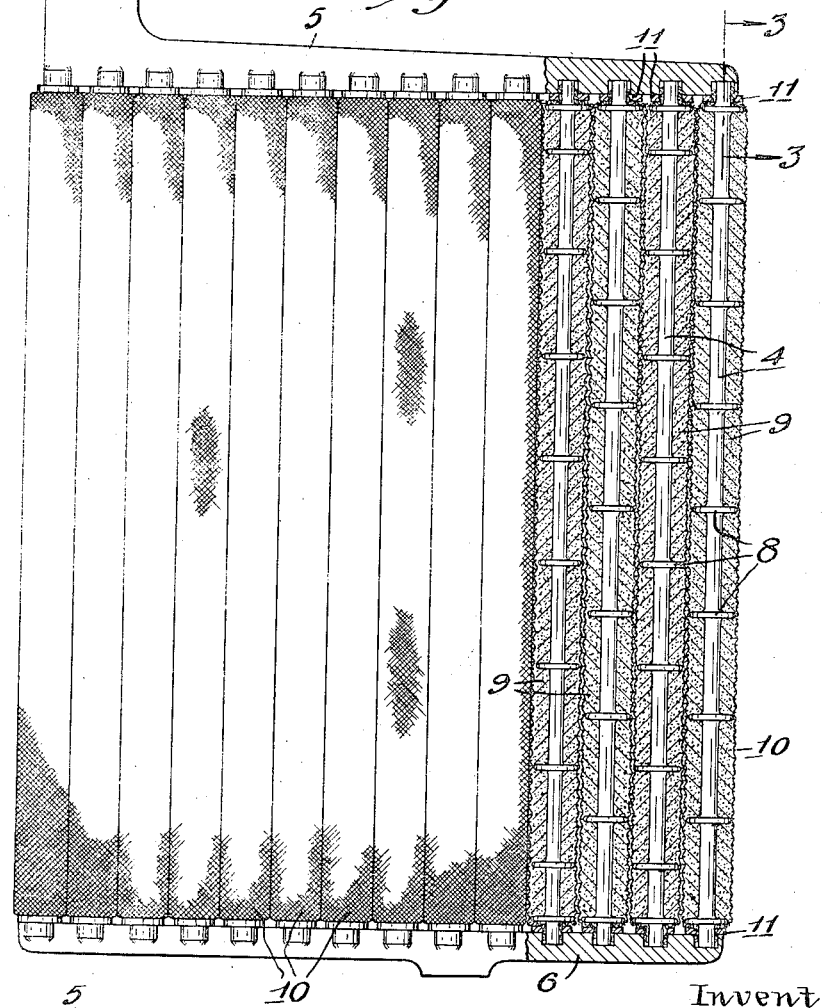
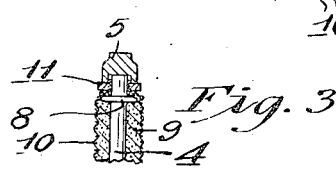
Inventor
Almond H. Snyder
By Snyder & Snyder
Attorneys Patented May 11, 1943

2,318,809

UNITED STATES PATENT OFFICE 2,318,809

POSITIVE ELECTRODE FOR STORAGE BATTERIES

Almond H. Snyder, Lancaster, N. Y., assignor to National Battery Company, St. Paul, Minn., a corporation of Delaware Application April 14, 1937, Serial No. 136,843

2 Claims. (Cl. 136—55)

It is my object to provide a novel electrode adapted to increase the capacity and prolong the life of storage batteries.

A particular object is to provide in a positive electrode a novel arrangement of conducting members and supporting and confining members for the active material whereby the capacity and life of the battery is increased by increasing the area of the conducting elements in contact with the active material by providing freer circulation of electrolyte to and through the active material and by reducing waste of active material by shedding.

The capacity of a storage battery is dependent chiefly upon the surface area of the positive plates, amount of active material, relation of the active material to the conducting members of the plates and freedom of circulation of electrolyte. By the present invention all of these conditions are improved so that a substantial increase in capacity is secured. The life of a battery is dependent largely on the life of the positive electrodes and the latter, while dependent on the conditions under which it is operated, is increased if the active material is retained in intimate contact with the conducting members and prevented from being washed out or from "shedding." The life of a battery is also increased by protecting the conducting members from corrosion which causes loss of mechanical strength and increase in resistance and by guarding against excessively high temperatures, as by assuring an adequate supply and free circulation of the acid at and between the surfaces of the plates or electrodes. By the present invention I protect against such corrosion and afford the desirable circulation of electrolyte to increase the life of the battery.

Referring to the accompanying drawing which illustrates the best form of my invention at present known to me:

Figure 1 is a part side elevation and part central vertical section through a battery plate or electrode embodying my improvements;

Fig. 2 is a part plan view and part horizontal section through a pair of my improved electrodes in a preferred relationship to a group of separators and negative plates, and Fig. 3 is a fragmentary section taken on the line 3—3 of Fig. 1.

Each of my improved positive plates or electrodes comprises a multiplicity of spaced parallel rods 4, held together in a group so as to extend vertically between a top bar 5 and a bottom bar 6. Integral with the top bar 5 is a lug 7 of the usual or suitable construction for connecting the plate in circuit. The members 4, 5, 6 and 7 are good conductors preferably constructed from antimony lead alloy. Formed integral with each of the rods 4 are a multiplicity of annular flanges 8 so arranged that the flanges on adjacent rods are staggered. Bodies of active material 9 completely envelope or encase the rods 4 and are confined thereon by porous sheathings 10 constructed from braided or woven glass filaments. Such a sheathing is acid resistant, highly porous and has great strength. The sheathing fabric is confined and prevented from raveling at the ends by rings 11 fitting snugly about the sheathing and ends of the supporting rods 4 near the junction of the same with the top and bottom bars 5 and 6.

In the manufacture of my improved electrodes the rods 4 with their integral flanges 8 are passed through a suitable extruding machine which packs the lead oxide paste (later to be made active) in close contact with the rods so that the paste completely fills the vertical spaces between flanges. These "pasted" rods are next dried and passed through a machine which applies the sheathing 10. The rings 11 are then placed over the ends of the rods and sheathing to bind the sheathing and the rods are finally assembled in a form and the bottom and top members 5 and 6 of the plate formed or burned to the ends of the rods. It will be understood that the size or capacity of each electrode or plate is determined by the number and length of the rods assembled as a unit and the capacity of a battery cell is determined by the size of the plates and number of plates installed in the cell.

Plates and separators are preferably assembled in a battery as indicated in Fig. 2. Each of the positive electrodes is enclosed in a foraminous, rubber envelope 12 and porous spacers 13 are placed between the envelopes and the negative plates 14. It will be understood that my improved positive electrode is adapted for use with other forms and arrangements of separators. A number of the improved electrodes together with the separators and negative plates are immersed in the electrolyte of a cell so that the electrolyte is free to circulate between plates of opposite polarity and through the porous and foraminous separators and sheathing 10 of each rod 4. The sheathings 10 allow only the finest, worn out particles of active material to escape and settle to the bottom of the cell.

The total surface area of the multiplicity of rods 4 comprising each plate is considerably greater than that of a flat plate of equal volume or displacement so that the plates have large capacity.

By my arrangement of the spaced parallel rods 4 unusually free access and circulation of the electrolyte to the active material is afforded. The annular flanges 8 divide the active material surrounding each rod into a multiplicity of small bodies each of which is independently supported on the rod. This prevents the active material, when it becomes softened, from settling to the bottom of the rod within each tubular sheathing. The flanges 8 also space the sheathing from the rods and maintain the cylindrical shapes throughout the life of the plates. Another function performed by the annular flanges is that of affording abutments for the spacers interposed between the positive and negative plates. The flanges 8, being staggered, distribute the points of contact and pressure over the separator surfaces thus avoiding any tendency to form horizontal lines of cleavage across the separators.

Having described my invention, what I claim as new and desire to protect by Letters Patent is:

1. A positive electrode for storage batteries comprising, a multiplicity of spaced, parallel and vertically extending rods, each formed with a multiplicity of vertically spaced annular flanges projecting therefrom, a porous, sheathing comprising glass filaments enclosing each of said rods and the flanges thereon, active material enclosed in said sheathing around each of said rods, said material being divided into a multiplicity of separate, cylindrical bodies by said flanges, top and bottom frame members connecting said rods together in a group and rings having their inner peripheries fitting snugly about the ends of the several sheathings and rods adjacent to said bars.

2. For storage battery plates comprising pencils of active material or material to become active mounted on metallic rods, joined at their ends to top and bottom bars, glass wool fabric tubes constituting self-sustaining structures and having continuous, uninterrupted walls enclosing the pencils, and individually attachable rings constricting the ends of the tubes on the rods.

ALMOND H. SNYDER.